United States Patent
Banach et al.

(10) Patent No.: US 9,751,686 B2
(45) Date of Patent: Sep. 5, 2017

(54) SINTER BONDED CONTAINMENT TUBE

(71) Applicants: SAINT-GOBAIN ABRASIVES, INC., Worcester, MA (US); SAINT-GOBAIN ABRASIFS, Conaflans-Sainte-Honorine (FR)

(72) Inventors: Lawrence M. Banach, Lockport, NY (US); John M. Bevilacqua, Williamsville, NY (US); Steven W. Lanzone, Williamsville, NY (US)

(73) Assignee: SAINT-GOBAIN CERAMICS & PLASTICS, INC., Worcester, MA (US)

( * ) Notice: Subject to any disclaimer, the term of this patent is extended or adjusted under 35 U.S.C. 154(b) by 0 days.

(21) Appl. No.: 15/015,986

(22) Filed: Feb. 4, 2016

(65) Prior Publication Data

US 2016/0152407 A1    Jun. 2, 2016

Related U.S. Application Data

(63) Continuation of application No. 13/849,125, filed on Mar. 22, 2013, now Pat. No. 9,290,311.

(Continued)

(51) Int. Cl.
*B65D 85/00* (2006.01)
*B65B 7/28* (2006.01)
(Continued)

(52) U.S. Cl.
CPC ............... *B65D 85/70* (2013.01); *B65B 5/02* (2013.01); *B65B 7/2821* (2013.01); *B65B 51/10* (2013.01);
(Continued)

(58) Field of Classification Search
CPC .......... G03C 3/00; G21C 3/16; G21C 17/048; G21F 5/008; F21F 5/10; Y10T 428/24355;
(Continued)

(56) References Cited

U.S. PATENT DOCUMENTS 2,855,355 A   10/1958  Ohlinger et al.
3,457,052 A    7/1969  Carlson et al.
(Continued)

FOREIGN PATENT DOCUMENTS

CN    1602252 A    3/2005
CN  101636364 A    1/2010
(Continued)

OTHER PUBLICATIONS

Lougher et al. "Design of compression shrink-fit ceramic-steel wear ring assembly for chemical mechanical planarization", 6 pgs, Mar. 24, 2000.

(Continued)

*Primary Examiner* — Chun Cheung
(74) *Attorney, Agent, or Firm* — Abel Law Group, LLP; Robert N. Young

(57) ABSTRACT

A containment tube includes a sealed tube comprising silicon carbide, first and second ends, an inner bore extending along at least a portion of its axial length between the first and second ends, and contains a radioactive material within the bore of the sealed tube. The first end has a plug residing in the inner bore to close the first end, and the second end has a distal wall that closes the inner bore at the second. At least one of the first or second ends is bonded to the sealed tube by a sinter bond.

19 Claims, 4 Drawing Sheets

Related U.S. Application Data

(60) Provisional application No. 61/614,508, filed on Mar. 22, 2012.

(51) Int. Cl.

| | | |
|---|---|---|
| *C04B 35/565* | (2006.01) | |
| *B65D 39/00* | (2006.01) | |
| *C04B 37/00* | (2006.01) | |
| *B65D 81/00* | (2006.01) | |
| *B65B 51/10* | (2006.01) | |
| *B65B 5/02* | (2006.01) | |
| *G21C 3/07* | (2006.01) | |
| *G21C 3/10* | (2006.01) | |
| *G21C 21/02* | (2006.01) | |

(52) U.S. Cl.
CPC ......... *B65D 39/0005* (2013.01); *B65D 81/00* (2013.01); *C04B 35/565* (2013.01); *C04B 37/001* (2013.01); *G21C 3/07* (2013.01); *G21C 3/10* (2013.01); *G21C 21/02* (2013.01); *Y02E 30/40* (2013.01)

(58) Field of Classification Search
CPC .. Y10T 428/1303; C04B 35/565; C04B 37/00
See application file for complete search history.

(56) References Cited

U.S. PATENT DOCUMENTS

| | | |
|---|---|---|
| 3,564,328 A | 2/1971 | Bagley |
| 3,631,973 A | 1/1972 | Rode |
| 4,179,299 A | 12/1979 | Coppola et al. |
| 4,293,325 A | 10/1981 | Chirino et al. |
| 4,299,638 A | 11/1981 | Matsuhisa |
| 4,487,664 A | 12/1984 | Dorbath et al. |
| 4,666,775 A | 5/1987 | Kim et al. |
| 4,679,960 A | 7/1987 | Mizuhara |
| 4,780,160 A | 10/1988 | Kipp |
| 4,783,229 A | 11/1988 | Mizuhara |
| 4,925,608 A | 5/1990 | Rossi et al. |
| 5,054,418 A | 10/1991 | Thompson et al. |
| 5,303,836 A | 4/1994 | Childress |
| 5,384,173 A | 1/1995 | Akao et al. |
| 5,611,877 A | 3/1997 | Yoshida |
| 5,941,302 A | 8/1999 | Hattori |
| 6,006,824 A | 12/1999 | Hattori et al. |
| 6,524,421 B1 | 2/2003 | Chen et al. |
| 6,648,597 B1 | 11/2003 | Widrig et al. |
| 8,087,567 B2 | 1/2012 | Meschke et al. |
| 8,501,082 B2 | 8/2013 | Hock et al. |
| 8,998,268 B2 | 4/2015 | Banach et al. |
| 9,290,311 B2 | 3/2016 | Banach et al. |
| 2004/0154725 A1 | 8/2004 | Mako et al. |
| 2004/0238982 A1 | 12/2004 | Hamaguchi et al. |
| 2006/0138962 A1 | 6/2006 | Wei et al. |
| 2007/0235122 A1 | 10/2007 | Meschke et al. |
| 2007/0272661 A1 | 11/2007 | Whitehead et al. |
| 2008/0131665 A1 | 6/2008 | Suyama et al. |
| 2008/0176056 A1 | 7/2008 | Kilgus et al. |
| 2009/0239007 A1 | 9/2009 | Meschke et al. |
| 2010/0038012 A1 | 2/2010 | Tucker et al. |
| 2010/0062396 A1 | 3/2010 | Hock et al. |
| 2011/0024431 A1* | 2/2011 | Yano ................. F16J 12/00 220/581 |
| 2013/0284634 A1 | 10/2013 | Banach et al. |
| 2013/0285370 A1 | 10/2013 | Banach et al. |
| 2013/0285371 A1 | 10/2013 | Banach et al. |
| 2015/0260322 A1 | 9/2015 | Mako, Jr. et al. |

FOREIGN PATENT DOCUMENTS

| | | |
|---|---|---|
| CN | 1827279 A | 12/2011 |
| CN | 202083233 U | 12/2011 |
| CN | 104271534 A | 1/2015 |
| CN | 104540796 A | 4/2015 |
| DE | 3905424 A1 | 8/1990 |
| DE | 4410767 A1 | 10/1994 |
| EP | 0479657 A1 | 4/1992 |
| EP | 1367037 A1 | 12/2003 |
| EP | 2828221 A1 | 1/2015 |
| EP | 2828222 A | 1/2015 |
| FR | 1112734 A | 3/1956 |
| GB | 1227695 A | 4/1971 |
| GB | 2019891 A | 11/1979 |
| GB | 2284376 A | 6/1995 |
| JP | 54144411 A | 11/1979 |
| JP | 06298574 A | 10/1994 |
| JP | 06298575 A | 10/1994 |
| JP | 07270093 A | 10/1995 |
| JP | 08187714 A | 7/1996 |
| JP | 201052966 A | 3/2010 |
| JP | 2010285326 A | 12/2010 |
| KR | 20070043884 A | 4/2007 |
| KR | 20100014337 A | 2/2010 |
| WO | 2007042808 A1 | 12/2003 |
| WO | 2006081957 A1 | 8/2006 |
| WO | 20130142828 A1 | 9/2013 |
| WO | 20130142829 A1 | 9/2013 |
| WO | 03477859 A1 | 2/2016 |

OTHER PUBLICATIONS

International Search Report and Written Opinion dated Jul. 5, 2013, with regard to International application PCT/US2013/033575.
International Search Report and Written Opinion dated Jul. 24, 2013, with regard to international application PCT/US2013/033574.

\* cited by examiner

SINTER BONDED CONTAINMENT TUBE

CROSS-REFERENCE TO RELATED APPLICATION

This application is a continuation application of and claims priority under 35 U.S.C. §120 to U.S. patent application Ser. No. 13/849,125, entitled "SINTER BONDED CONTAINMENT TUBE", by Banach et al., filed Mar. 22, 2013, which claims priority under 35 U.S.C. §119(e) to U.S. Patent Application No. 61/614,508 entitled "SINTER BONDED CONTAINMENT TUBE," by Banach et al., filed Mar. 22, 2012, both of which are assigned to the current assignee hereof and incorporated herein by reference in their entireties.

FIELD OF THE DISCLOSURE

This disclosure, in general, relates to containment tubes, and more particularly to sealed containment tubes comprising silicon carbide.

BRIEF DESCRIPTION OF THE INVENTION

A sintered ceramic sealed tube has first and second ends and an inner bore extending along at least a portion of its axial length between the first and second ends, the first end having a plug residing in the inner bore to close the first end, the second end having a distal wall to close the inner bore at the second end. The ceramic tube, or the plug, or both, may comprise silicon carbide, and in certain embodiments comprise principally silicon carbide, such that silicon carbide is the majority compositional species of the tube. The ceramic sealed tube includes a sinter bond between at the tube and at least the distal wall or the plug, such that the sinter bond forms a hermetic seal, or interference bond, that includes no bond materials.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION

Figure 1:
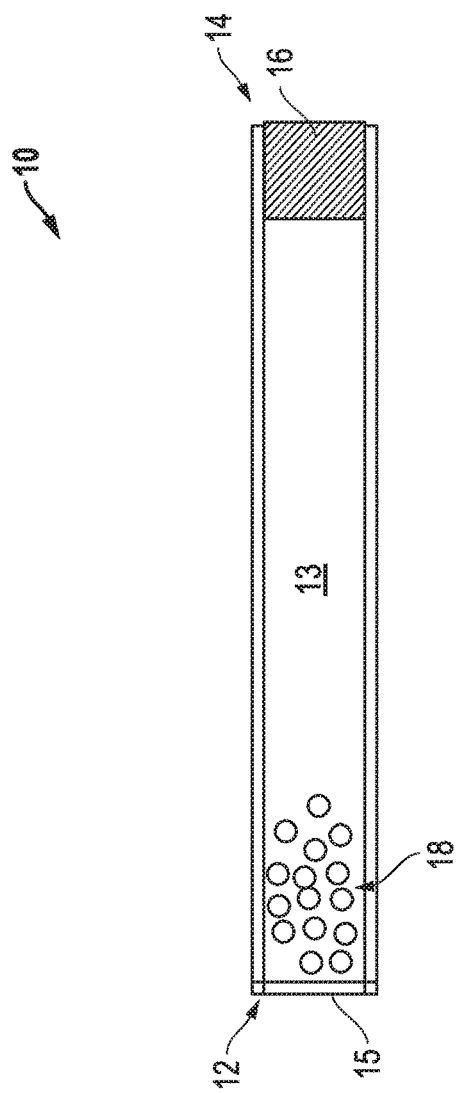
FIG. 1 shows an embodiment of a containment tube having radioactive material contents within the tube, and a distal wall and a plug sealing the tube, and in which at least one of the distal wall or plug are sinter-bonded to the tube.

Embodiments of the present invention are generally drawn to containment tubes and methods for forming containment tubes. In one embodiment, a containment tube includes a sealed tube comprising silicon carbide, the sealed tube having a generally constant diameter along its axial length and containing a radioactive material. A "generally constant diameter" means that the outer diameter of the tube does not vary considerably from a nominal or average diameter value. According to one embodiment, any measureable diameter variances do not exceed 15% of the nominal diameter value, such as not greater than 10%, not great than 5%, not greater than 4%, not greater than 3%, not greater than 2%, or not greater than 1%. In one embodiment, to the naked eye, the containment tube appears to be uniform and rectilinear.

In particular, in one embodiment, a sintered ceramic sealed tube has first and second ends and an inner bore extending along at least a portion of its axial length between the first and second ends, the first end having a plug residing in the inner bore to close the inner bore at the first end, the second end having a distal wall to close the second end. The ceramic tube, or the plug, or both, may comprise silicon carbide, and in certain embodiments comprise principally silicon carbide, such that silicon carbide is the majority compositional species of the tube, typically greater than at least about 70 wt %, such as greater than at least about 80 wt %, or greater than at least about 90 wt %. In another embodiment, the tube may comprise silicon carbide in an amount greater than at least about 91 wt %, at least about 95%, at least about 99%, at least about 95%, at least about 99.85 wt %. One particular form of silicon carbide is used according to certain embodiments, known as HEXOLOY®-brand silicon carbide (manufactured by Saint-Gobain Advanced Ceramics Corporation of Worcester, Mass., USA), described in U.S. Pat. No. 4,179,299 incorporated herein by reference. Suitable silicon carbides generally contain silicon carbide in an amount greater than at least about 91 wt %, such as greater than at least about 99.85 wt %, up to about 5.0 wt % carbonized organic material, from at least about 0.15 wt % to not greater than about 3.0 wt % boron, and up to about 1.0 wt % additional carbon. The "carbonized organic material" is free carbon or uncombined carbon produced in situ by the carbonization of the organic material used as a raw material in the process of forming the ceramic tube. The carbonizable organic materials that can be used in forming the ceramic tube are well known in the art, and include but are not limited to phenolic resin, coal tar pitch, polyphenylene, or polymethylphenylene, and the like.

Sintered ceramic bodies of silicon carbide according to an embodiment may be characterized by a predominantly equi-axed microstructure, meaning the presence of grains having an aspect ratio of less than 3:1 (i.e., the ratio of the maximum dimension of the grains of the crystal microstructure to the minimum dimension of the grains of the crystal microstructure is less than 3:1). Moreover, the silicon carbide comprises at least about 95 wt %, such as at least about 99 wt % alpha-phase, non-cubic crystalline silicon carbide.

The density of silicon carbide according to an embodiment is at least about 2.40 g/cm$^3$, such as at least about 2.90 g/cm$^3$, or at least about 3.05 g/cm$^3$.

A better understanding of the embodiments of the present invention may be better had with reference to the drawings. In particular, in connection with FIG. 1, an embodiment of a containment tube is illustrated. As shown, the containment tube 10 has a generally elongate body, which may be described or quantified in terms of aspect ratio, which is the ratio of length to outside diameter. With respect to the relationship of length (L) to outer diameter (DO) referred to herein as aspect ratio, generally the tube will have an aspect ratio of not less than about 10:1, such as not less than about 20:1, such as not less than about 30:1, or not less than about 40:1. Typically, the aspect ratio is limited, as extended length tubes are difficult to handle and fully sinter. Consequently, aspect ratios typically do not exceed 300:1.

The containment tube 10 includes a first end 14, and a second end 12. Along the inner bore 13 of the containment tube, is provided a plug 16 at the first end, closing the first end hermetically. In an embodiment, the plug 16 closes the first end and provides a hermitic seal by way of a sinter bond, or interference bond, between the plug 16 and the first end 14 of the tube 10. The second end has a distal wall 15 which, in this particular embodiment, is integrated into the outer wall forming the outside diameter of the tube. In an embodiment, the distal wall 15 is integrated into the outer wall by a sinter bond, or interference bond. Radioactive material 18 is disposed within the tube, generally remote from first end 14 and plug 16.

Figure 2:
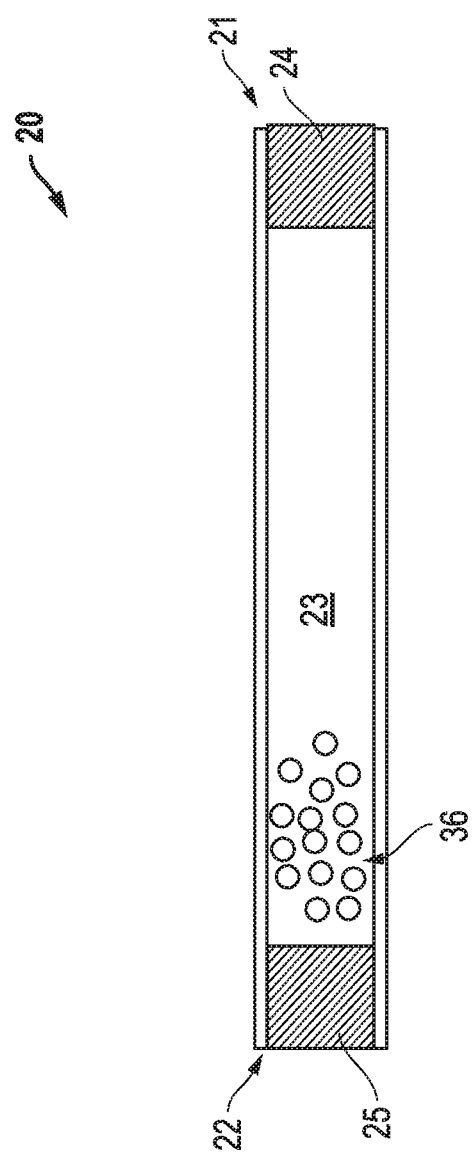
FIG. 2 shows an embodiment of a containment tube having two plugs.

Turning to FIG. 2, another embodiment of a containment tube is illustrated. Containment tube 20 includes a first end 21, a second end 22, a bore 23, and first and second plugs 24 and 25 respectively provided to close the bore at first and second ends 21, 22, respectively. That should be clear, the containment tube 20 differs from containment tube 10 in that containment tube 20 has a dual-plug structure. Accordingly, at least one of the first end 21 and the second end 22 of the containment tube 20 includes a sinter bond, or interference bond, with the respective first or second plugs 24 and 25.

Figure 3:
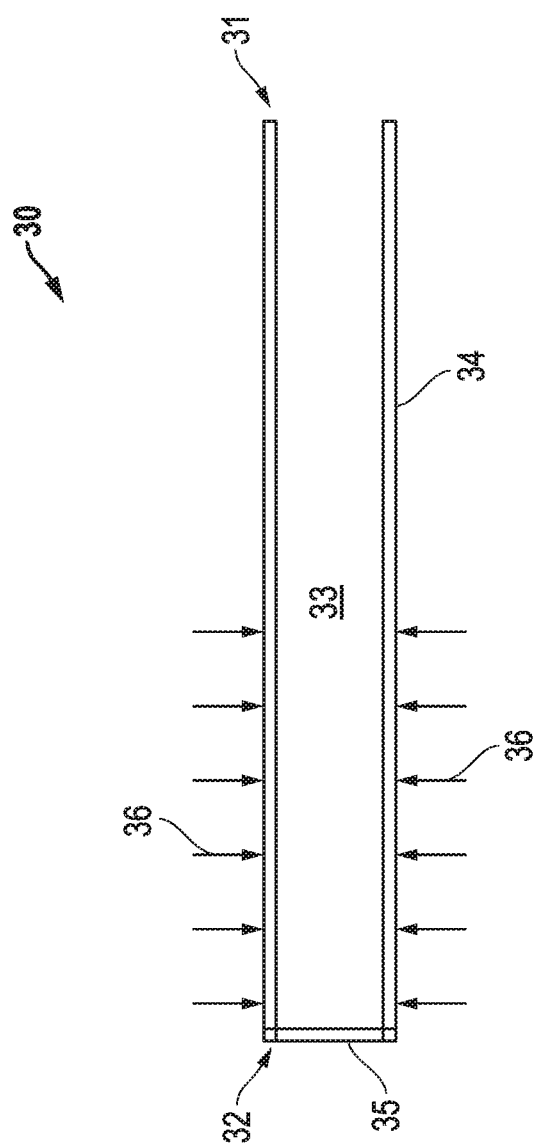
FIG. 3 shows an embodiment of a green tube exposed to partial sintering.

According to a particular feature, containment tubes according to embodiments herein may be formed through a multi-step sintering process. Turning to FIG. 3, a green containment tube 30 is shown, having an inner bore 33, an outer wall 34, first and second ends 31, 32 respectively, the second end 32 having a distal wall 35 closing the bore at the second end 32. The green tube 30 may be formed of any one of known manufacturing techniques. Although various forming techniques can be utilized for fabrication of the tube, such as slip casting, isopressing, machining of large stock materials, and other forming techniques, extrusion may be used according to particular embodiments. Extrusion represents a cost-effective and desirable fabrication approach for making multiple articles requiring tubes of varying lengths and diameters.

Sintered ceramic bodies of silicon carbide according to an embodiment may be characterized by the amount the bodies shrink from a green state to a fully sintered state. For example, green ceramic bodies of silicon carbide according to an embodiment may shrink more than about 10% from their original size, more than about 12%, more than about 15%, more than about 17%, less than about 25%, less than about 20%, less than about 17%, less than about 15% upon being fully sintered. In a particular embodiment, a green ceramic body of silicon carbide may shrink approximately 17% from its original size upon being fully sintered. When combining a pre-sintered first component, such as a plug or distal wall, with a green second component, such as an un-sintered portion of a tube, that circumvents the pre-sintered first component, the shrinkage relationship, and the amount of interference bond, can be expressed as follows.

$$ID_{t,FS} = OD_p - \Delta,$$

where $ID_{t,FS}$ is the inside diameter (ID) of a fully sintered tube, $OD_p$ is the outside diameter (OD) of the pre-sintered plug, and $\Delta$ is the intereference (tube undersizement). For example, a pre-sintered plug has a bond surface, or outside diameter, of 2.0" (i.e. $OD_t = 2.0$). An interference bond of 5% (i.e. $\Delta = 5\%$) of a second body, such as the tube, requires a fully sintered tube ID ($ID_{t,FS}$) to be 0.10" less than the $OD_p$ (i.e. 2.0*5% = 0.10), or 1.90" (i.e. $ID_{t,FS} = OD_p - \Delta$, or 1.90" = 2.0" - 0.10"). Thus, to attain a 5% interference of a fully sintered tube on the pre-sintered plug, the green portion of the tube (i.e. the un-sintered portion of the tube) will be made to have a theoretically fully sintered inner diameter (if it were sintered by itself) of 1.90".

Further, the ID of the green second component (i.e. the un-sintered portion of the tube) can be expressed as follows.

$$ID_{t,FS}/(1-R_s) = ID_t,$$

where $ID_t$ is the inner diameter of the green second component, or un-sintered portion of the tube, and $R_s$ is the shrinkage rate of the second component (expressed as a decimal). Thus, in accordance with the example given above, and assuming the shrinkage rate of the second component is 17.0%, the inner diameter of the green portion of the tube ($ID_t$) can be calculated as $1.9 \div (1-0.170) = 2.289"$.

Following appropriate shape formation (i.e. forming of the green ceramic tube), the green tube 30 may be subjected to a machining operation during which the outer surface of the ceramic tube is machined prior to pre-sintering. Stated alternatively, this machining step is carried out in the green state, where the tube is in a state that allows easier material removal than in the sintered state. Moreover, the machining may be effective to reduce or even completely remove dimensional (out-of-roundness) or surface irregularities of the green tube. For example, in the case of extrusion, the green tube may have characteristic score lines extending partially or wholly along the entire length of the tube. Those score lines can inhibit the formation of a strong interfacial sinter bond, as well as a hermetic seal. In the case of other formation technologies, machining may still be desirable. For example, in the case of isopressing or molding, characteristic imperfections may be left behind on the green tube, such as a flashing.

Both the surface cleaning and machining steps may be carried out through mechanical abrasion processes. Mechanical abrasion can include machining using a free abrasive (e.g., an abrasive slurry), a coated abrasive, or a fixed abrasive. The species of abrasive product is chosen to prevent unwanted chemical interaction with or foreign deposits on the tube, while also providing adequate material removal rates. Generally speaking in the case of silicon carbide, abrasive materials such as alumina are avoided, and materials such as silicon carbide and superabrasives, notably including cubic boron nitride (CBN) and diamond, are utilized. In the green state, machining may be carried out with silicon carbide and in the sintered state, surface cleaning may be done with silicon carbide or a superabrasive species. In practice, embodiments have made use of coated abrasives, such as a silicon carbide, CBN, or diamond abrasive coated on a closed looped belt, mounted to a belt sander.

While the cleaning steps above set forth in connection with a tube, particularly the outer surface of the tube, the foregoing cleaning operations can be carried out with respect to an inner surface of the tube and particularly the plugs.

Figure 4:
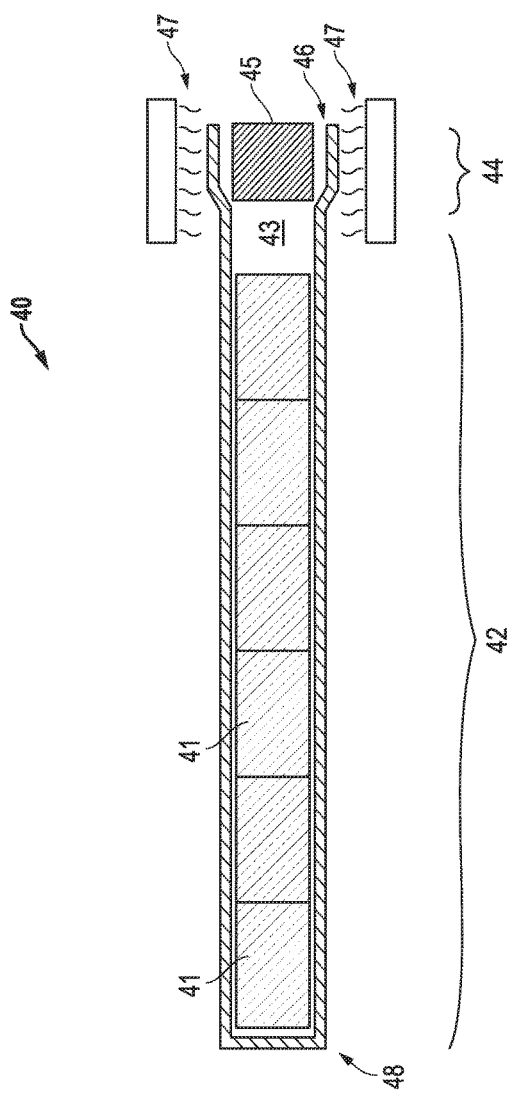
FIG. 4 shows an embodiment of a partially green, un-sintered tube having radioactive material contents and a plug, in which a portion of the un-sintered tube circumventing the plug is exposed to sintering.

According to one particular feature, processing may continue with partial sintering of the tube. As shown in FIG. 3, partial sintering 36 is carried out with respect to a portion of the tube including a middle portion extending to the second end, leaving the first end unheated, or only partially sintered such that the second end does not shrink to its final dimensions. Upon completion of partial sintering 36, the tube is in a hybrid state, a central portion of the tube extending to the second end being fully sintered and shrunk to its final dimensions, the first end being still in the green state or only partially sintered. This hybrid state can be better seen in connection with FIG. 4, in which containment tube 40 shows sintered portion 42, and partially or un-sintered portion 44 extending to the first end 46. As can be seen, the first end 46 has a larger inside diameter and outside diameter relative to the second end 48 which has already undergone densification and shrinkage. Typically, the differences in outside diameter from the first end to the second end are on the order of 1-20%, sometimes larger.

Processing continues with incorporation with radioactive material 41 into the inner bore 43 of the tube, and placement of plug 45 in the bore at the first end 46. Typically, the plug used to seal one or both ends of the containment tube structure is formed of the same material as the tube, in accordance with the above description.

Upon completion of forming a green ceramic plug, the plug proceeds to a pre-sintering step to form a sintered plug. Pre-sintering can be carried out in any one of known furnaces, including continuous furnaces or a batch furnace that translate the work piece (herein, the plug) through the furnace at a constant or variable rate. Pre-sintering is generally carried out at a temperature above 2000° C., such as above 2050° C., but generally below 2400° C., such as below 2300° C., such as below 2250° C. A suitable target range for sintering the green ceramic plug in the case of silicon carbide can lie within a range of 2100-2200° C. Sintering times can vary, and are largely dependent on the thermal mass of the plug. However, typically sintering times range from 15 minutes to 10 hours, such as not less than about 30 minutes, such as not less than about 1 hour, such as not less than about 1.5 hours. While large, high mass plugs may require extended sintering times, typically sintering times do not exceed 30 hours, such as not great than 20 hours, such as not greater than 10 hours.

Accordingly, the machining operations applied the tube can also be applied to the outside of the plug. After the sintering step is completed, at least a portion of an outer surface of the sintered plug is subjected to surface cleaning. Typically, at least the portion of the plug that will contact the base component will be subjected to surface cleaning. In this respect, it has been found that the outer surface of the plug can carry contaminates, such as contaminates that are deposited during the sintering process, or which form as a consequence of the sintering process and changes in the crystallographic and compositional structure of the plug. For example, binders within the composition may burn-out, leaving behind a carbonaceous residue on the outer surface of the plug. That carbonaceous residue, generally in the form of free carbon, can negatively impact the quality of bond between the plug and the base component, inhibiting a hermetic seal.

Thereafter, sintering 47 (i.e. co-sintering the first end 46 and the plug 45) takes place to complete the sintering of the partially or un-sintered portion 44, shrinking it to its final dimensions, forming a completed containment tube having a generally constant outside diameter, and resembling the structure shown in FIG. 1, and providing a sinter bond between the first end 46 and the plug 45. The sinter bond between the first end and the plug is defined as an interface bond, or an interference bond, and includes no bond materials. The green silicon carbide material of the un-sintered portion 44 of the first end 46 shrinks to some degree upon sintering, and the quality of the interference bond is at least in part due to selecting a size of the green, un-sintered second portion 44. As discussed above, the quality of the interference bond is also attributable to preparing the surface of the pre-sintered silicon carbide component to remove contaminants from its surface.

The interface bond has at least one of the following performance characteristics: a Shear Strength not less than about 25 MPa, a Nitrogen Seal Performance of not greater than 10%, a Helium Seal Performance of not greater than 10%, and/or a Vacuum Seal Performance of not greater than 10%.

In one embodiment, the interface between the first and the second component exhibits a Shear Strength not less than about 25 MPa, not less than about 40 MPa, not less than about 50 MPa, not less than about 75 MPa, not less than about 100 MPa, not less than about 120 MPa, not less than about 140 MPa, not less than about 170 MPa, or not less than about 200 MPa. In one embodiment, the interface between the first and the second component exhibits a Shear Strength not greater than about 1000 MPa, such as not greater than about 700 MPa, not greater than about 500 MPa, or not greater than about 300 MPa.

As used herein, reference to Shear Strength as a particular Shear Strength value is measured by testing a sample having standardized dimensions under load. In particular, the Shear Strength is measured by preparing and testing a standardized sample as follows. The sample is prepared from a ceramic tube and a ceramic ring, each having a length of 76.2 mm. The ceramic tube has an outer diameter ($OD_t$) of 14 mm and an inner diameter ($ID_t$) of 11 mm. The ceramic ring has an outer diameter ($OD_r$) of 20 mm, and an inner diameter ($ID_r$) of 14 mm. The ceramic ring is placed around the ceramic tube so that the ends of each are flush, and the tube-ring assembly is then co-sintered. After cooling, a cross-sectional center segment is sliced from the sintered assembly and thickness grinded to a final thickness (t) of 3 mm. The center segment comprises an inner ring sliced from the ceramic tube and an outer ring sliced from the ceramic ring. The area of contact between the inner and outer rings represents the total bond area ($A_b$), and is calculated according to the following formula:

$$A_i = \pi \cdot OD_r \cdot t \qquad \text{(Formula I)}$$

The Shear Strength of the center segment sample is tested at room temperature using an Instron 8562 using a 100 kN load cell at a speed of 0.05 mm/min, which applies equal but opposing force to the inner and outer rings, respectively. The magnitude of the applied force is gradually increased until the rings break apart. The force (F) required to break the rings apart is measured in Newtons. The Shear Strength ($\tau$) value is obtained according to the following formula:

$$\tau = F \cdot A_b \cdot 10^6 \qquad \text{(Formula II)}$$

It should be understood that ceramic articles as described herein can be a wide variety of dimensions and overall sizes, but the Shear Strength values are based on a standardized geometry and testing approach as described above. Consequently, validating the Shear Strength of a sample having differing dimensions larger or smaller than the standardized sample described above requires the fabrication of a standardized sample under identical compositional and processing conditions to that of the sample having differing dimensions.

A Nitrogen Seal Performance is determined according to a nitrogen seal performance test, wherein nitrogen is applied at an interface of a seal at a given initial positive pressure, and pressure loss is measured by a pressure gauge. Nitrogen Seal Performance is the percent pressure drop occurring across the seal interface over a period of 2 hours at an applied gauge pressure, such as 200 psi. Embodiments herein achieve a Nitrogen seal performance of not greater than 10%, not greater than 9%, not greater than 8%, not greater than 7%, not greater than 6%, not greater than 5%, not greater than 4%, not greater than 3%, not greater than 2%, not greater than 1.9%, not greater than 1.8%, not greater than 1.7%, not greater than 1.6%, not greater than 1.5%, not greater than 1.4%, not greater than 1.3%, not greater than 1.2%, not greater than 1.1%, not greater than 1.0%, not greater than 0.9%, not greater than 0.8%, not greater than 0.7%, not greater than 0.6%, not greater than 0.5%, not greater than 0.4%, not greater than 0.3%, not greater than 0.2%, or not greater than 0.1% of an initial pressure differential of 200 PSI (gauge pressure).

A Helium Seal Performance is determined according to a helium seal performance test, wherein helium is applied at an interface of a seal at a given initial positive pressure and pressure loss is measured by a pressure gauge. Helium Seal Performance is achieved if the pressure drop occurring across the seal interface over a period of 2 hours is not greater than 10%, not greater than 9%, not greater than 8%, not greater than 7%, not greater than 6%, not greater than 5%, not greater than 4%, not greater than 3%, not greater than 2%, not greater than 1.9%, not greater than 1.8%, not greater than 1.7%, not greater than 1.6%, not greater than 1.5%, not greater than 1.4%, not greater than 1.3%, not greater than 1.2%, not greater than 1.1%, not greater than 1.0%, not greater than 0.9%, not greater than 0.8%, not greater than 0.7%, not greater than 0.6%, not greater than 0.5%, not greater than 0.4%, not greater than 0.3%, not greater than 0.2%, or not greater than 0.1% of an initial pressure differential of 87 PSI (gauge pressure), an initial pressure differential of about 200 psi (about 13.8 bar), or an initial pressure differential of about 6 barg (bar gauge).

A Vacuum Seal Performance is determined according to a vacuum seal performance test. In the vacuum seal performance test, a vacuum is applied to a seal. The nitrogen gas atmosphere inside the tube is then lowered from 1 ATM (760 torr) to a pressure of 10 torr thereby having a pressure differential of 750 torr. Vacuum Seal Performance is achieved if the gain inside the tube occurring across the seal interface over a period of 2 hours is not greater than 10%, not greater than 9%, not greater than 8%, not greater than 7%, not greater than 6%, not greater than 5%, not greater than 4%, not greater than 3%, not greater than 2%, not greater than 1.9%, not greater than 1.8%, not greater than 1.7%, not greater than 1.6%, not greater than 1.5%, not greater than 1.4%, not greater than 1.3%, not greater than 1.2%, not greater than 1.1%, not greater than 1.0%, not greater than 0.9%, not greater than 0.8%, not greater than 0.7%, not greater than 0.6%, not greater than 0.5%, not greater than 0.4%, not greater than 0.3%, not greater than 0.2%, or not greater than 0.1% of the pressure differential (750 torr).

In each of the seal performance tests, the bond or interface is subjected to the above-described pressure differential. Depending on the geometry of the part, an inner volume is pressurized or evacuated, and holes plugged. In a case of an external seal, such as in the case of a flange on a tube, an end-cap is positioned to cover the flange and exposed bore of the tube, the cap being offset from the bore to allow fluid communication (and hence pressure/vacuum) extending radially up to the bond region. Caps/plugs can have varying geometries to fit the part undergoing test, and can be sealed with a vacuum grease to ensure a pressure tight, hermetic seal.

What is claimed is:

1. A containment tube comprising:
   a sintered tube comprising silicon carbide;
   a generally constant diameter along an axial length of the sintered tube; and
   a plug comprising silicon carbide, wherein the plug is sinter-bonded to the sintered tube,
   wherein the sintered tube is sealed.

2. The containment tube of claim 1, the sintered tube, the plug, or both comprise at least 70 wt % of silicon carbide.

3. The containment tube of claim 2, the sintered tube, the plug, or both comprise at least 90 wt % of silicon carbide.

4. The containment tube of claim 1, wherein the sintered tube has first and second ends and an inner bore extending along at least a portion of its axial length between the first and second ends, the first end having the plug residing in the inner bore to close the first end, and the second end having a distal wall that closes the inner bore at the second end.

5. The containment tube of claim 1, wherein the sintered tube contains a radioactive material.

6. The containment tube of claim 1, wherein the sintered tube has:
   a Shear Strength not less than about 25 MPa; or
   a Nitrogen Seal Performance of not greater than 10%; or
   a Helium Seal Performance of not greater than 10%; or
   a Vacuum Seal Performance of not greater than 10%; or
   any combination thereof.

7. A containment tube comprising:
   a tube comprising silicon carbide and having a first end, a closed second end, and an inner bore extending between the first end and the second end; and
   a plug sinter-bonded to an inner wall of the tube proximate to the first end of the tube and configured to close the first end of the tube.

8. The containment tube of claim 7, wherein the tube comprising silicon carbide is hermetically sealed.

9. The containment tube of claim 7, wherein the second end has a distal wall integrated to an outer wall of the tube comprising silicon carbide.

10. The containment tube of claim 7, wherein the tube comprising silicon carbide has a generally constant diameter along an axial length of the tube.

11. The containment tube of claim 7, wherein the tube comprises at least 70 wt % of silicon carbide.

12. The containment tube of claim 7, wherein the plug comprises at least 70 wt % of silicon carbide.

13. A method of forming a containment tube, comprising:
   providing a green ceramic tube having a first end that is unsealed and a second end that is sealed;
   partially sintering the green ceramic tube, leaving the first end unsintered or incompletely sintered;
   inserting a sintered plug into the first end; and
   sealing the first end by sintering the first end together with the sintered plug.

14. The method of claim 13, further comprising forming the green ceramic tube by extrusion.

15. The method of claim 13, wherein partially sintering comprises leaving the unsealed end incompletely sintered so that the first end of the tube is not shrunk to final dimensions.

16. The method of claim 13, wherein sealing the first end comprises applying localized heat to the first end.

17. The method of claim 13, further comprising placing a radioactive material into the partially sintered tube via the first end prior to inserting a sintered plug into the first end.

18. The method of claim 13, wherein the ceramic tube, the plug, or both comprises at least 70 wt % of silicon carbide.

19. The method of claim 13, further comprising removing surface contaminants from an inner circumferential surface of the first end of the tube, an outer circumferential surface of the plug, or both.

\* \* \* \* \*